US011765190B2

(12) United States Patent
Sircar

(10) Patent No.: US 11,765,190 B2
(45) Date of Patent: Sep. 19, 2023

(54) METHOD FOR CREATING A ZERO TRUST SEGMENTED NETWORK PERIMETER FOR AN ENDPOINT OR IDENTITY

(71) Applicant: BlackBerry Limited, Waterloo (CA)

(72) Inventor: Shiladitya Sircar, Ottawa (CA)

(73) Assignee: BlackBerry Limited, Waterloo (CA)

( * ) Notice: Subject to any disclaimer, the term of this patent is extended or adjusted under 35 U.S.C. 154(b) by 270 days.

(21) Appl. No.: 17/159,248

(22) Filed: Jan. 27, 2021

(65) Prior Publication Data

US 2022/0239679 A1 Jul. 28, 2022

(51) Int. Cl.
*H04L 9/40* (2022.01)
*G06F 18/23213* (2023.01)

(52) U.S. Cl.
CPC .... *H04L 63/1425* (2013.01); *G06F 18/23213* (2023.01); *H04L 63/102* (2013.01); *H04L 63/1416* (2013.01); *H04L 63/166* (2013.01); *H04L 63/20* (2013.01)

(58) Field of Classification Search
CPC ............... H04L 63/1425; H04L 63/102; H04L 63/1416; H04L 63/166; H04L 63/20; H04L 63/0209; H04L 63/0227; H04L 63/101; G06K 9/6223
See application file for complete search history.

(56) References Cited

U.S. PATENT DOCUMENTS

| | | |
|---|---|---|
| 10,122,757 B1 | 11/2018 | Kruse et al. |
| 2010/0250918 A1 | 9/2010 | Tremblay et al. |
| 2014/0059216 A1* | 2/2014 | Jerrim ................... H04L 67/104 709/224 |
| 2016/0006753 A1* | 1/2016 | McDaid .............. H04W 12/128 726/23 |
| 2018/0131624 A1 | 5/2018 | Samadani et al. |
| 2018/0198812 A1* | 7/2018 | Christodorescu ... H04L 63/1425 |
| 2019/0068570 A1 | 2/2019 | Ghafourifar et al. |
| 2020/0162503 A1* | 5/2020 | Shurtleff ................. G06F 9/451 |
| 2020/0236112 A1 | 7/2020 | Pularikkal et al. |
| 2020/0274815 A1 | 8/2020 | Sreevalsan et al. |
| 2020/0366717 A1 | 11/2020 | Chaubey |
| 2021/0112032 A1* | 4/2021 | DiRosa ............... H04L 63/1416 |

OTHER PUBLICATIONS

Wijnands, K. J. (2015) "Detecting malware using process tree and process activity data" [Master thesis, Delft University of Technology]. Faculty of Technology, Policy and Management, http://resolver.tudelft.nl/uuid:e1678077-9056-47ac-82e6-2762bfb40a63 (Year: 2015).*
Extended European Search report dated Jun. 15, 2022, Application No. 22150625.6.

* cited by examiner

*Primary Examiner* — Michael R Vaughan
(74) *Attorney, Agent, or Firm* — Rowand LLP

(57) ABSTRACT

Methods and devices are provided for determining a service associated with an unclassified traffic flow in a computer network. Classification information for a plurality of classified traffic flows in the computer network are obtained that indicate an association between each of the classified flows and a service. A primary cluster analysis is performed on the plurality of classified flows and the unclassified flow to associate the unclassified flow to a group of classified flows having a common service. The association between the unclassified flow and the common service is provided to a network security management system.

19 Claims, 5 Drawing Sheets

METHOD FOR CREATING A ZERO TRUST SEGMENTED NETWORK PERIMETER FOR AN ENDPOINT OR IDENTITY

FIELD

The present application generally relates to network security, and more particularly, to creating a Zero Trust segmented network perimeter for an endpoint or identity.

BACKGROUND

In a Zero Trust networking system, it may be challenging for enterprise system administrators to create network policies or perimeters for an end user. For example, if an administrator wants to allow a certain application or service to be accessed by an end-user device, the administrator may first need to identify all destination network connections (i.e. internet protocol (IP) addresses) used by the application or service.

This may be problematic, since a system administrator cannot be aware of all of the destination IP addresses used by a given application or service. For example, while an administrator may easily identify certain destination network connections associated with an application or service, the application or service may use other IP addresses that are unknown to the administrator, such as content delivery networks (CDN) and/or other third party services. As well, the network destinations associated with some destination network connections may change on a regular basis, and keeping track of these destinations may be a tedious and time-consuming process for a system administrator and/or an entire information technology (IT) department.

Thus, the process of creating network policies or perimeters for an endpoint, identity and/or an end user may require manual steps, and may require knowledge of all network services and associated IP addresses and/or ports. In addition, developing an effective network policy for an endpoint, identity and/or end user requires the administrator to know what type of work or organization the user may be part of in order to understand what network services the user may need to access.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Acronyms

Figure 1:
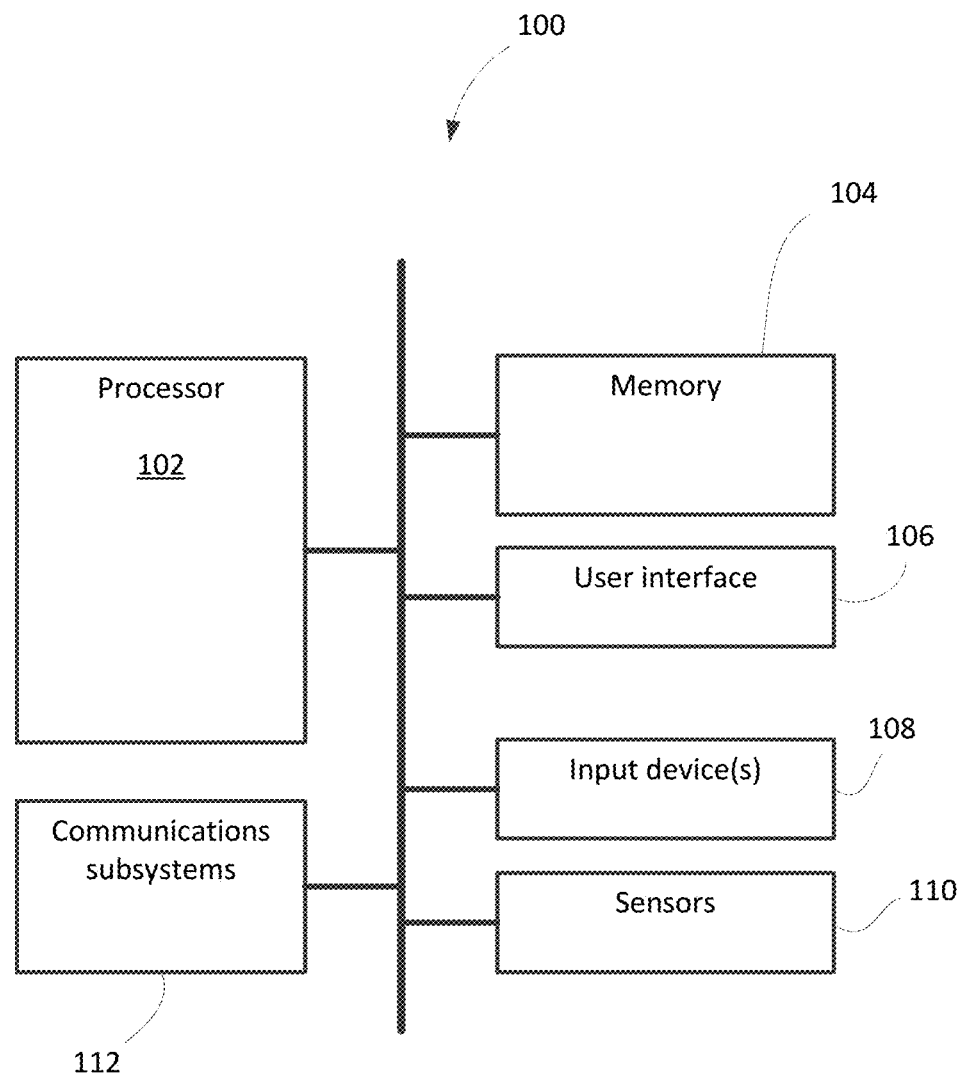
FIG. 1 shows, in block diagram form, a simplified example of a computing device.

Various acronyms are used throughout the present disclosure. Definitions of the most prominently used acronyms that may appear throughout the present disclosure are provided below:

AD: Active Directory
CDN: Content Delivery Network
DNS: Domain Name System
GUI: Graphical User Interface
IaaS: Infrastructure as a Service
IP: Internet Protocol
IT: Information Technology
MiTM: Man in the Middle
SaaS: Software as a Service
SNI: Server Name Indication
TLS: Transport Layer Security In a first aspect, the present application describes a computer-implemented method of determining a service associated with an unclassified traffic flow in a computer network. The method may include obtaining classification information for a plurality of classified traffic flows in the computer network, wherein the classification information indicates an association between each of the plurality of classified flows and one of a plurality of services. The method may further include performing a primary cluster analysis on the plurality of classified flows and the unclassified flow to associate the unclassified flow to a group of classified flows having a common service, determining that the unclassified flow is associated with the common service, and providing the determination to a network security management system.

In some implementations, the network security management system combines the determination with user network access grouping information to create baseline network security profiles for one or more user access groups. In some implementations, the network security management system creates a custom user profile based on an intersection or a union of the baseline network security profiles associated with a user.

In some implementations, providing the determination to a network security management system comprises modifying a user access policy to whitelist an internet protocol (IP) address associated with the unclassified flow.

In some implementations, the classified traffic flow and/or the classified traffic flow may be encrypted. In some implementations, the unclassified traffic flow may be a Transport Layer Security (TLS) flow.

In some implementations, performing a primary cluster analysis comprises partitioning flows based on one or more flow attributes. In some implementations, the flow attributes may comprise one or more of the following: bytes transmitted, packets transmitted, data rate transmitted, packet rate transmitted, packet size transmitted per packet, duration of bidirectional flow, bytes Received, packets received, data rate downlink, packet rate downlink, packet size received per packet, temporal parameter "t" till idle, and domain name system (DNS) name. Temporal parameter "t" is a time window within which subsequent network flows have occurred.

In some implementations, the cluster analysis is a k-means cluster analysis, for example, a Hartigan-Wong cluster analysis. In some implementations, the primary cluster analysis is based on a preliminary cluster analysis applied to the plurality of classified flows and a respective user associated with each of the classified flows.

In yet a further aspect, the present application describes a non-transitory computer-readable storage medium storing processor-readable instructions that, when executed, configure a processor to perform any of the methods described herein. Also described in the present application is a computing device comprising: a processor, memory, and an application containing processor-executable instructions that, when executed, cause the processor to carry out at least one of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Although many of the example computing devices described and discussed below are mobile devices, such as smartphones, tablets, and laptops, the present application is not limited to mobile devices and may be implemented in connection with non-mobile devices.

As applications continue to move to the cloud, security is increasingly becoming a concern, with endpoint devices accessing a cloud-based application from potentially anywhere in the world. Indeed, applications hosted in the cloud are particularly susceptible to malicious attacks on protected data.

Zero Trust networking is a relatively new paradigm that seeks to address some of the security concerns associated with cloud-based applications. Cloud based applications may include Software as a Service (SaaS) applications, enterprise applications utilizing Infrastructure as a Service (IaaS) and enterprise applications hosted in a datacenter. In general, Zero Trust networking operates under the principle that all networks are untrusted by default, including both private enterprise networks and external public networks. Thus, for example, even if a malicious entity were to gain access to an endpoint device in a private enterprise network, the malicious entity may be prevented from making lateral movements in the network (e.g., from the infected device to a server), thanks to the segmentation of network resources by application of Zero Trust networking principles to the network. However, while Zero Trust networking is effective in many scenarios, it also takes a relatively limited approach to allowing access to a network resource. Since many cloud applications regularly move content from one web server to another, an endpoint device (end user) may find itself blocked from content associated with a necessary application until the network identifies the new web server as trusted.

A system and method that learns end-user's network access behaviour, and is able to group flows into application classes or services (thus allowing administrators to be able to create network perimeters or network policies) is highly desirable. As well, a system and method that is able to classify network traffic, understand end-user context, (for example, which Active Directories (AD) a user belongs to), and automatically segmented network profiles that may be applied as policies is also highly desirable. It is also highly desirable to achieve these results without requiring the decryption of network traffic.

Reference is now made to FIG. 1, which shows, in block diagram form, a simplified example of a computing device 100. The computing device 100 includes a processor 102, memory 104, a user interface 106, and one or more input devices 108. The memory 104 may include temporary memory and persistent memory. The user interface 106 may include a display screen in many embodiments, but may also include other sensory output devices including a speaker, vibratory mechanism, e-ink display, or other such devices. The input devices 108 may include a touch-sensitive input device like a touchscreen, a keyboard, a keypad, a camera, a microphone, a gyroscope, an accelerometer, and various other input mechanisms.

The computing device 100 may further include various sensors 110, some of which may be input devices 108, and one or more communications subsystems 112. The communications subsystems 112 enable wired or wireless communication with other computing devices. Example communication subsystems 112 include a cellular system for data and/or voice communication over a cellular network, including 3G, 4G or 5G networks, a Wi-Fi chip for data connection with a wireless local area network (WLAN), a short-range wireless system like a Bluetooth™ chip, a near-field communications (NFC) chip, an Ethernet port, or any other communications systems operating in accordance with any applicable communications protocol.

Figure 2:
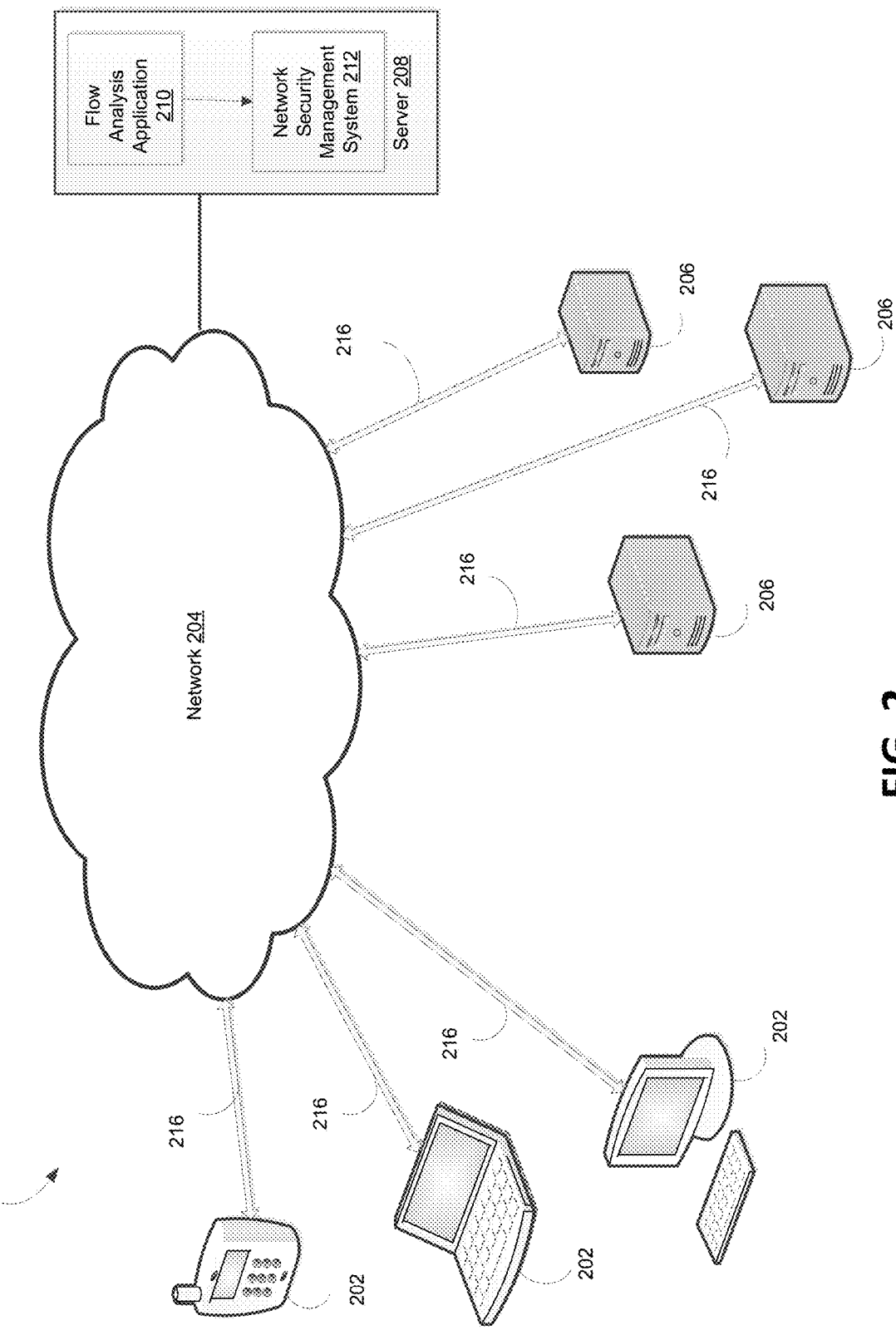
FIG. 2 shows an example system in which methods and devices in accordance with the present description may be implemented.

Reference is now made to FIG. 2, which shows an example system 200 in which methods and devices in accordance with the present description may be implemented. Trusted endpoints 202 are configured to communicate with other network destinations 206, for example, web servers, via a computer network 204. The computer network 204 may include wired networks, wireless networks, or combinations thereof, and may include the Internet. In some embodiments, trusted endpoints 202 may be mobile devices, such as a smartphone, smartwatch, laptop, tablet, wearable, or may be non-mobile devices, such as desktop computing devices.

The network 204 may be connected to a flow analysis application 210. In some embodiments, the flow analysis 210 may reside on a server 208. The flow analysis application 210 may be configured to communicate with a network management system 212. In some embodiments, the network management system 212 and the flow analysis application 210 may reside on the same server. In some embodiments, the flow analysis application 210 and the network security management system 212 may reside on different servers. In some embodiments, the network security management system 212 may comprise a plurality of servers.

Many organizations exercise enterprise control over computing devices and resources that may be accessed by computing devices. An organization may exercise a specific control over a specific application or set of applications. The organization may alternatively or additionally manage an entire endpoint device or profile on an endpoint device. In general, the organization may govern the ability of a computing device to access an enterprise network and may push device policies and security policies to the computing devices. As a result of this control, an enterprise may monitor network traffic at endpoint devices, and may determine that certain endpoint devices are "trusted".

In a Zero Trust network, all network resources may be untrusted by default. As a result, one or more trusted endpoints 202 may attempt to connect with one or more network destinations 206. Trusted endpoints 202 may make these attempts via an originating application or service allowed by the network security management system, such as for, example, Office 365™ and/or Salesforce™. Alternatively, trusted endpoints 202 may make these attempts to connect with one or more destinations 206 directly, or via an application that is not allowed by the network management system, such as a gambling application. Attempts by the endpoints to connect to an untrusted network destination may result in one or more bidirectional connections, or flows 216. Flow analysis application 210 may then attempt to classify these flows 216 to their originating applications. Classification techniques may include, for example using the 5-Tuple (source IP address, source port, destination IP address, destination port, and transport protocol) of the network packets flowing in either direction. Classification techniques may also include inspecting the unencrypted parts of the TLS connection handshake during connection establishment such as certificates exchanged, server name indication (SNI) data, and the domain name system (DNS).

Classification by flow analysis application 210 may result in the identification of one or more classified flows and one or more unclassified flows. In order to associate an unclassified flow to its originating application or service, a clustering algorithm may be applied to the flows. The clustering algorithm may be applied along with temporal order within the time series of flows.

Flow clustering may require correctly partitioning flows per application class into groups based on various flow attributes. These flow attributes may include bytes transmitted, packets transmitted, data rate transmitted, packet rate transmitted, packet size transmitted per packet, duration of the flow in both directions, bytes received, packets received, data rate downlink, packet rate downlink, packet size received per packet, temporal parameter "t" till idle, and DNS name. Thus, a vector identifying a cluster may be represented as F per application based on the above parameters.

Cluster analysis of the flows may then be applied. In some embodiments, computationally efficient Hartigan-Wong implementation of cluster analysis may be implemented for flow cluster analysis of k-means. In some embodiments, another k-means cluster analysis may be implemented. Once segmented and clustered, these flows may then be labelled automatically with their corresponding enterprise application class or service; for example, Microsoft™ services, Salesforce™ services or Workday™ Services. The labelling may occur automatically based on bias of each flow on the associated SNI/DNS for the cluster name.

The named TLS flow clusters may then be provided to network security management system 212. Network security management system 212 may then enrich the flow clusters with active directory (AD) grouping. Network security management system 212 may modify one or more user access policies to whitelist one or more IP addresses associated with one or more named flow clusters. As a result, customized policy templates for each user or group of users within an organization may be created. Administrators may then select these policies and/or create exclusions from these policies. Dissecting the clustered flows with named AD groups may help administrators visualize the type of applications, including shadow IT applications, that are used in the enterprise.

An advantage of the method described above is that, after execution for a just short period of time with a few users, the method may provide enterprise specific policy templates.

Figure 3:
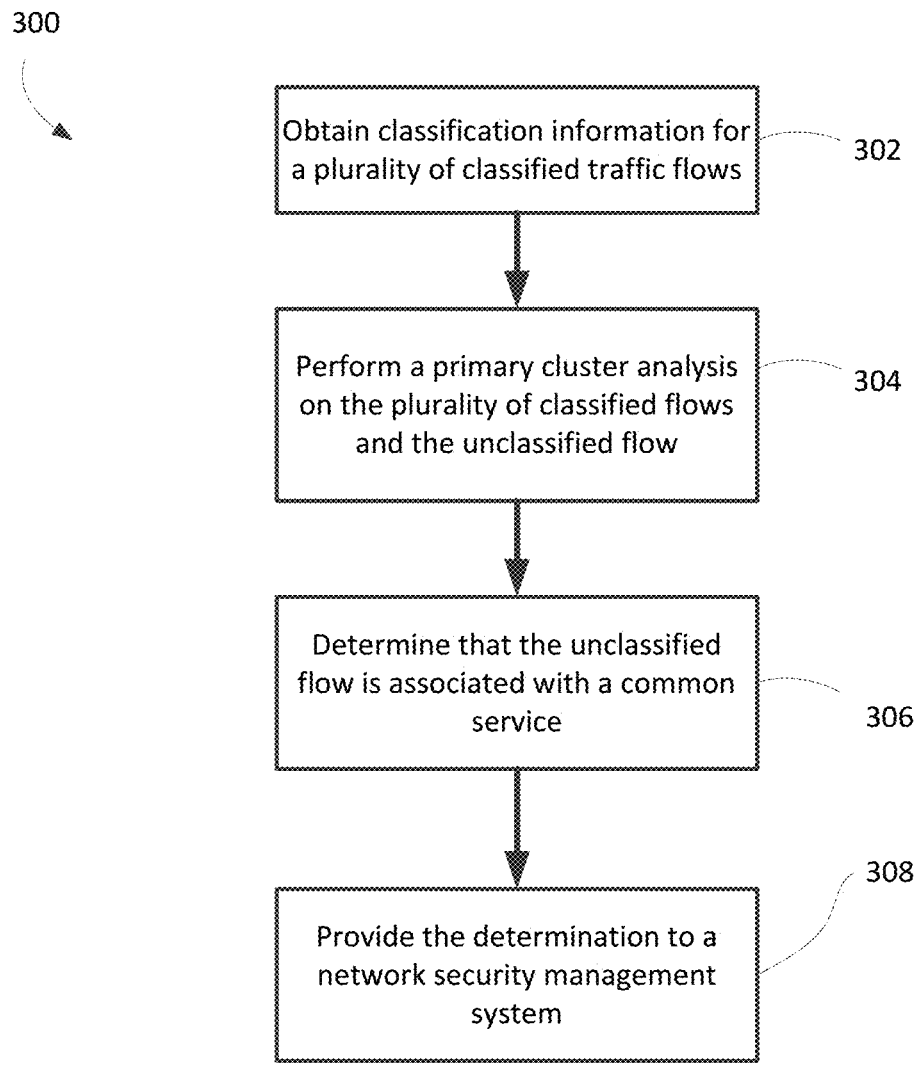
FIG. 3 shows, in flowchart form, one example method for determining a service associated with an unclassified flow.

Reference is now made to FIG. 3, which shows, in flowchart form, an example method 300 for determining a service associated with an unclassified traffic flow in a computer network. The method 300 may be implemented through processor-executable instructions that, when executed by one or more processors, cause the processors to carry out the described operations. Example operations or functions are described below.

In operation 302, classification information for a plurality of classified flows is obtained. The classification information may include an association between each of the plurality of classified flows and one of a plurality of applications or services. For example, a number of flows may be observed between a user device or endpoint and a plurality of destination IP addresses. In order to determine which of these flows are associated with an application or service the user is allowed to access, (for example, Office 365™ or Salesforce™), classification of these flows by application or service may be desirable.

Historically, classification of flows has been implemented through the application of traffic decryption. However, with the growth of end-to-end encrypted traffic usage in applications such as TLS cert-pinning and the adoption of TLS 1.3, traffic decryption, including MiTM-based approaches, may no longer be possible. As well, privacy is increasingly important and inspecting content as it flows through the network may have legal implications.

The first step in creating a policy is to group a set of connections and identify the application or service associated with each set of connections. A common method for classifying flows is through an evaluation of the associated 5-Tuple information (source IP address, destination IP address, source port, destination port and protocol). In some embodiments, wherein the flow is a TLS flow, further classification may be acquired through inspection of unencrypted parts of a TLS connection handshake, including looking for certificates exchanged, SNI data, and DNS. Once a destination is classified, various traffic flow policies may then be applied to the destination. However, it may not be possible to easily detect the applications associated with the traffic merely based on network 5-Tuple information and/or observing unencrypted parts of a connection. A single application on a mobile or desktop device may require many connections and many flows; there may be N flows that define a single application. As this type of classification may successfully classify some, but not all, flows to a given application, additional analysis may be required.

In operation 304, a primary cluster analysis is performed on the plurality of classified flows and the unclassified flow. Flow clustering involves correctly partitioning flows per application class into groups based on various flow attributes. Examples of flow attributes that may be used for this purpose include: bytes transmitted, packets transmitted, data rate transmitted, packet rate transmitted, packet size transmitted per packet, duration of the flow in both direction, bytes received, packets received, data rate downlink, packet rate downlink, packet size received per packet, temporal parameter "t" till idle, and DNS name. Thus, a vector identifying a cluster can be represented as F per application based on the above parameters.

The primary cluster analysis may include a k-means cluster analysis, such as a computationally efficient Hartigan and Wong implementation of cluster analysis. The segregation of the clustering may be examined. For example, clustering may be performed on both the network traffic and on the users of the network traffic. Clustering may be implemented in two steps: there may be a preliminary clustering of the traffic followed by a primary clustering on an end user's use of the traffic, corresponding to an N-dimensional clustering in a 2-relational space. In other words, there may be a preliminary clustering of services followed by a primary clustering of end users using those services. The clustering of flows based on end users may provide associations between applications or services and one or more AD groups. With reference to step 306, once segmented and clustered, these flows may then be labelled automatically with their associated enterprise application class or service. Examples of enterprise application classes or services include, for example, Microsoft™ services, Salesforce™ services and Workday™ services. The labelling may occur automatically based on bias of each flow on the associated SNI/DNS for the cluster name.

At step 308, the determination of the associated service to the unclassified flow is provided to a network security management system. These named flow clusters may then be enriched with user AD grouping information. In this way, customized policy templates for each user or group of users within an organization may be created. This may allow Administrators to select a policy or create exclusions from the same policy. Dissecting the clustered flows with named AD groups may also help Administrators visualize the type of applications, including shadow IT applications, that are used in the enterprise.

Figure 4:
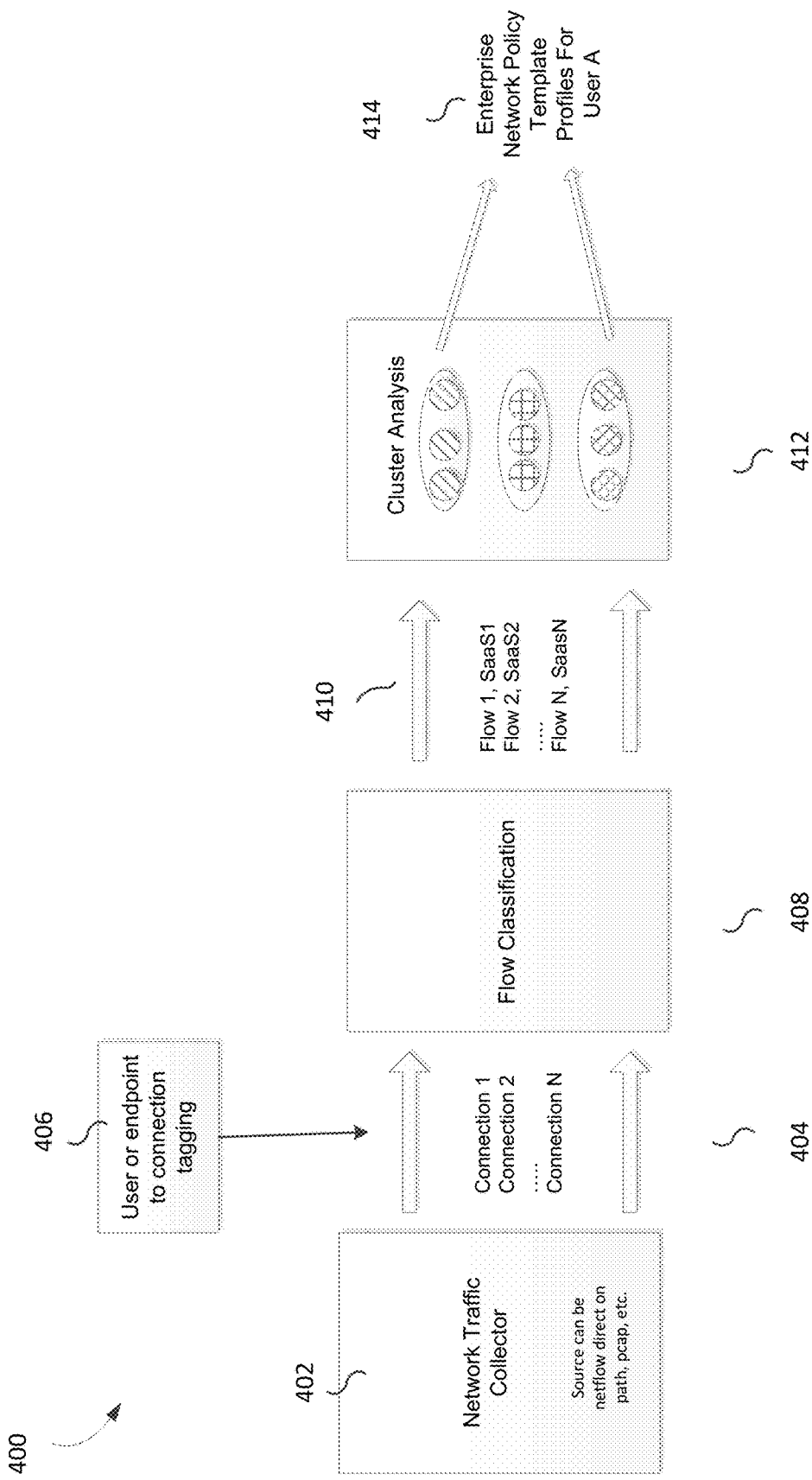
FIG. 4 shows an example of data processing and unsupervised classification, in accordance with one embodiment.

FIG. 4 illustrates data processing, unsupervised classification and cluster analysis in accordance with one embodiment. At 402, a network traffic collector receives and analyzes network traffic information. The network traffic information may be received from a source such as NetFlow and/or pcap. Information associating users and/or endpoints to one or more connections or flows may be provided at step 406. Classification of the connections or flows may take place at step 408. At step 410, information associating flows to respective applications 410 is then provided for cluster analysis at step 412. Information 410 may also include an indication of one or more flows having no corresponding association, i.e., unclassified flows. As a result of cluster analysis 412, one or more unclassified flows may be associated with an application or service. The results of cluster analysis 412 may then be provided to a network security management system, where the results may be used to provide enterprise network policy templates for one or more end users 414.

Figure 5:
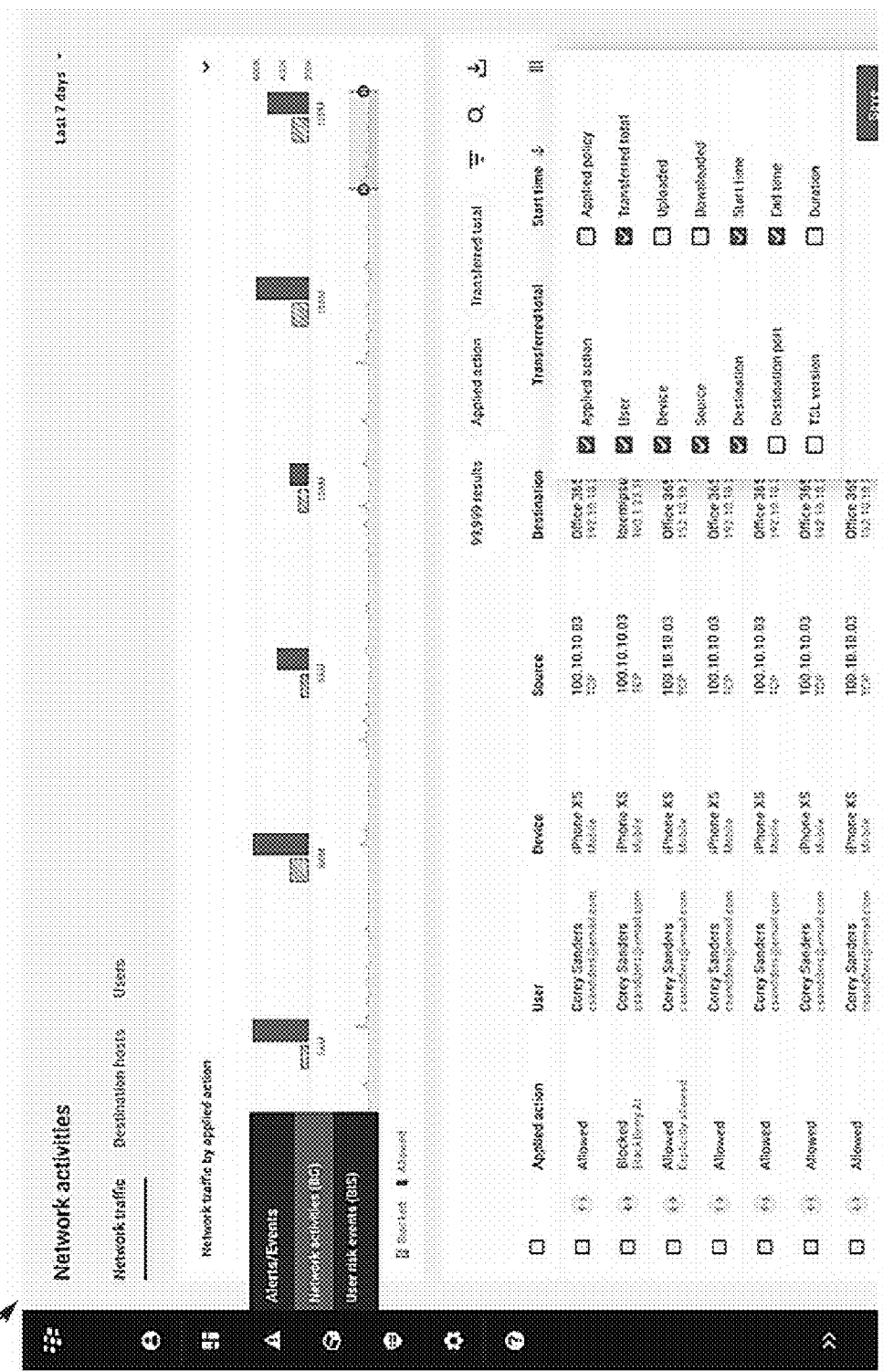
FIG. 5 shows an example administrator graphical user interface (GUI) illustrating association between clustered flows a service.

FIG. 5 illustrates a graphical user interface (GUI) 500 that may be used to provide the results of flow classification to one or more administrators, in accordance with one embodiment. Column 502 provides a listing of a number of various network flows. Column 504 provides a listing of applications or services associated with the various network flows, which may have been identified through flow classification and flow clustering. In accordance with some embodiments, administrators may use GUI 500 to select, or create exclusions from, network security policies.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A computer-implemented method of determining a service associated with an unclassified traffic flow in a computer network, the method comprising:
   obtaining classification information for a plurality of classified traffic flows in the computer network, wherein the classification information indicates an association between each of the plurality of classified traffic flows and one of a plurality of services;
   performing a primary cluster analysis on the plurality of traffic classified flows and a respective user associated with each of the classified traffic flows and the unclassified traffic flow to associate the unclassified traffic flow to a group of classified traffic flows having a common service;
   determining that the unclassified traffic flow is associated with the common service; and
   providing the determination to a network security management system for combination with user network access grouping information to create a network security profile for one or more user access groups.

2. The computer-implemented method of claim 1, wherein the network security management system creates a custom user profile based on an intersection or a union of the network security profiles associated with a user.

3. The computer-implemented method of claim 1, wherein creating the network security profile includes modifying a user access policy to whitelist an internet protocol (IP) address associated with the unclassified traffic flow.

4. The computer-implemented method of claim 1, wherein the unclassified traffic flow is encrypted.

5. The computer-implemented method of claim 1, wherein the unclassified traffic flow and the plurality of classified traffic flows are encrypted.

6. The computer-implemented method of claim 1, wherein the primary cluster analysis is based on a preliminary cluster analysis applied to the plurality of classified traffic flows and the respective user associated with each of the classified traffic flows.

7. The computer-implemented method of claim 1, wherein the cluster analysis is a k-means cluster analysis.

8. The computer-implemented method of claim 7, wherein the cluster analysis is a Hartigan-Wong cluster analysis.

9. The computer-implemented method of claim 1, wherein the unclassified traffic flow is a Transport Layer Security (TLS) flow.

10. The method claimed in claim 1, wherein performing a cluster analysis comprises partitioning flows based on one or more flow attributes.

11. The method claimed in claim 10, wherein the one or more flow attributes include at least one attribute selected from the group consisting of bytes transmitted, packets transmitted, data rate transmitted, packet rate transmitted, packet size transmitted per packet, duration of bidirectional flow, bytes Received, packets received, data rate downlink, packet rate downlink, packet Size received per packet, temporal parameter t till idle, and domain name system (DNS) name.

12. A computing device comprising:
a processor;
a memory;
an analysis application stored in the memory and containing processor-executable instructions that, when executed by the processor, cause the processor to determine a service associated with an unclassified traffic flow in a computer network, wherein the processor-executable instructions are to cause the processor to:
- obtain classification information for a plurality of classified traffic flows in the computer network; wherein the classification information indicates an association between each of the plurality of classified traffic flows and one of a plurality of services;
- perform a primary cluster analysis on the plurality of classified traffic flows and a respective user associated with each of the classified traffic flows and the unclassified traffic flow to associate the unclassified traffic flow to a group of classified traffic flows having a common service;
- determine that the unclassified traffic flow is associated with the common service; and
- provide the determination to a network security management system for combination with user network access grouping information to create a network security profile for one or more user access groups.

13. The computing device of claim 12, wherein creating the network security profile includes modifying a user access policy to whitelist an internet protocol (IP) address associated with the unclassified traffic flow.

14. The computing device of claim 12, wherein the unclassified traffic flow is encrypted.

15. The computing device of claim 12, wherein the unclassified traffic flow and the plurality of classified traffic flows are encrypted.

16. The computing device of claim 12, wherein performing a cluster analysis comprises partitioning flows based on one or more flow attributes.

17. The method claimed in claim 16, wherein the one or more flow attributes include at least one attribute selected from the group consisting of bytes transmitted, packets transmitted, data rate transmitted, packet rate transmitted, packet size transmitted per packet, duration of bidirectional flow, bytes Received, packets received, data rate downlink, packet rate downlink, packet Size received per packet, temporal parameter t till idle, and domain name system (DNS) name.

18. The computing device of claim 12, wherein the primary cluster analysis is based on a preliminary cluster analysis applied to the plurality of classified traffic flows and the respective user associated with each of the classified traffic flows.

19. A non-transitory computer-readable storage medium storing processor-executable instructions for determining a service associated with an unclassified traffic flow in a computer network, wherein the processor-executable instructions, when executed by a processor, are to cause the processor to:
- obtain classification information for a plurality of classified traffic flows in the computer network; wherein the classification information indicates an association between each of the plurality of classified traffic flows and one of a plurality of services;
- perform a primary cluster analysis on the plurality of classified traffic flows and a respective user associated with each of the classified traffic flows and the unclassified traffic flow to associate the unclassified traffic flow to a group of classified traffic flows having a common service;
- determine that the unclassified traffic flow is associated with the common service; and
- provide the determination to a network security management system for combination with user network access grouping information to create a network security profile for one or more user access groups.

* * * * *